(12) United States Patent
Nam et al.

(10) Patent No.: US 11,038,577 B2
(45) Date of Patent: Jun. 15, 2021

(54) POWER RAMPING FOR RANDOM ACCESS CHANNEL (RACH) PREAMBLE TRANSMISSIONS WITH BEAM SWITCHING

(71) Applicant: QUALCOMM Incorporated, San Diego, CA (US)

(72) Inventors: Wooseok Nam, San Diego, CA (US); Tao Luo, San Diego, CA (US); Muhammad Nazmul Islam, Littleton, MA (US); Makesh Pravin John Wilson, San Diego, CA (US); Xiao Feng Wang, San Diego, CA (US); Sumeeth Nagaraja, San Diego, CA (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/281,994

(22) Filed: Feb. 21, 2019

(65) Prior Publication Data

US 2019/0268060 A1     Aug. 29, 2019

Related U.S. Application Data

(60) Provisional application No. 62/635,924, filed on Feb. 27, 2018.

(51) Int. Cl.
*H04B 7/06* (2006.01)
*H04W 74/08* (2009.01)

(52) U.S. Cl.
CPC ....... *H04B 7/0695* (2013.01); *H04W 74/0833* (2013.01)

(58) Field of Classification Search
CPC .......... H04W 74/0833; H04W 72/042; H04W 72/046; H04W 74/006; H04W 56/001; H04B 7/0695
See application file for complete search history.

(56) References Cited

U.S. PATENT DOCUMENTS

2014/0376466 A1   12/2014   Jeong et al.
2016/0192401 A1   6/2016    Park et al.
2020/0107275 A1*  4/2020    Cho .................... H04B 7/0695

OTHER PUBLICATIONS

Intel: "Summary of [NR99#28] [NR] Beam Selection for HO Access", 3GPP Draft; R2-1710588, 3rd Generation Partnership Project (3GPP), Mobile Competence Centre ; 650, Route Des Lucioles ; F-06921 Sophia-Antipolis Cedex; France, vol. RAN WG2, No. Prague, Czech Republic; Oct. 9, 2017-Oct. 13, 2017, Sep. 29, 2017 (Sep. 29, 2017), XP051355017, 27 Pages, Retrieved from the Internet: URL:http://www.3gpp.org/ftp/tsg_ran/WG2_RL2/TSGR2_99bis/Docs/ [retrieved on Sep. 29, 2017], 4th row, 2nd column, lines 3-5; p. 17.

(Continued)

*Primary Examiner* — Rahel Guarino
(74) *Attorney, Agent, or Firm* — Patterson & Sheridan, L.L.P.

(57) ABSTRACT

Certain aspects of the present disclosure provide techniques for transmitting a random access channel (RACH) preamble. For example, certain aspects provide a method for wireless communication by a user-equipment (UE). The method generally includes generating a message comprising a random access channel (RACH) preamble, determining an order of a plurality of beams for transmitting the message based on an indication of the order, and transmitting the message, to a network node, via the plurality of beams in accordance with the determined order of the beams.

25 Claims, 15 Drawing Sheets

(56) References Cited

OTHER PUBLICATIONS

International Search Report and Written Opinion—PCT/US2019/019141—ISA/EPO—May 15, 2019.
Nokia et al., "Beam Selection During NR HO", 3GPP Draft; R2-1711461 Beam Selection During NR HO, 3rd Generation Partnership Project (3GPP), Mobile Competence Centre; 650, Route Des Lucioles ; F-06921 Sophia-Antipolis Cedex ; France, vol. RAN WG2, No. Prague, Czech Republic; Oct. 9, 2017-Oct. 13, 2017, Oct. 8, 2017 (Oct. 8, 2017), XP051343444, 2 Pages, Retrieved from the Internet: URL:http://www.3gpp.org/ftp/Meetings_3GPP_SYNC/RAN2/Docs/ [retrieved on Oct. 8, 2017], "Proposal 3"; p. 2.

\* cited by examiner

POWER RAMPING FOR RANDOM ACCESS CHANNEL (RACH) PREAMBLE TRANSMISSIONS WITH BEAM SWITCHING

CROSS-REFERENCE TO RELATED APPLICATIONS

This application claims benefit of U.S. Provisional Patent Application Ser. No. 62/635,924, filed Feb. 27, 2018, which is expressly incorporated herein by reference in its entirety.

BACKGROUND

Field of the Disclosure

Aspects of the present disclosure relate generally to wireless communications systems, and more particularly, to a protocol for random access channel (RACH) transmissions.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more BSs may define an eNodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques for transmitting a random access channel (RACH) preamble.

Certain aspects provide a method for wireless communication by a user-equipment (UE). The method generally includes generating a message comprising a RACH preamble, determining an order of a plurality of beams for transmitting the message based on an indication of the order, and transmitting the message, to a network node, via the plurality of beams in accordance with the determined order of the beams.

Certain aspects provide an apparatus for wireless communication. The apparatus generally includes a processing system configured to generate a message comprising a RACH preamble, and determine an order of a plurality of beams for transmitting the message based on an indication of the order, and a transmitter configured to transmit the message, to a network node, via the plurality of beams in accordance with the determined order of the beams.

Certain aspects provide an apparatus for wireless communication. The apparatus generally includes a processing system configured to determine an order of a plurality of beams for receiving a message, based on an indication of the order, wherein the message comprises a RACH preamble, and a receiver configured to receive the message, from a UE, via the plurality of beams in accordance with the determined order of the beams.

Certain aspects provide an apparatus for wireless communication. The apparatus generally includes means for generating a message comprising a RACH preamble; means for determining an order of a plurality of beams for transmitting the message based on an indication of the order; and means for transmitting the message, to a network node, via the plurality of beams in accordance with the determined order of the beams.

Certain aspects provide an apparatus for wireless communication. The apparatus generally includes means for determining an order of a plurality of beams for receiving a message, based on an indication of the order, wherein the message comprises a RACH preamble, and means for receiving the message, from a UE, via the plurality of beams in accordance with the determined order of the beams.

Certain aspects provide a computer-readable medium having instructions stored thereon, that when executed by a processor, caused an apparatus to generate a message comprising a RACH preamble, determine an order of a plurality of beams for transmitting the message based on an indication of the order, and transmit the message, to a network node, via the plurality of beams in accordance with the determined order of the beams.

Certain aspects provide a computer-readable medium having instructions stored thereon, that when executed by a processor, caused an apparatus to determine an order of a plurality of beams for receiving a message, based on an indication of the order, wherein the message comprises a RACH preamble, and receive the message, from a UE, via the plurality of beams in accordance with the determined order of the beams.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
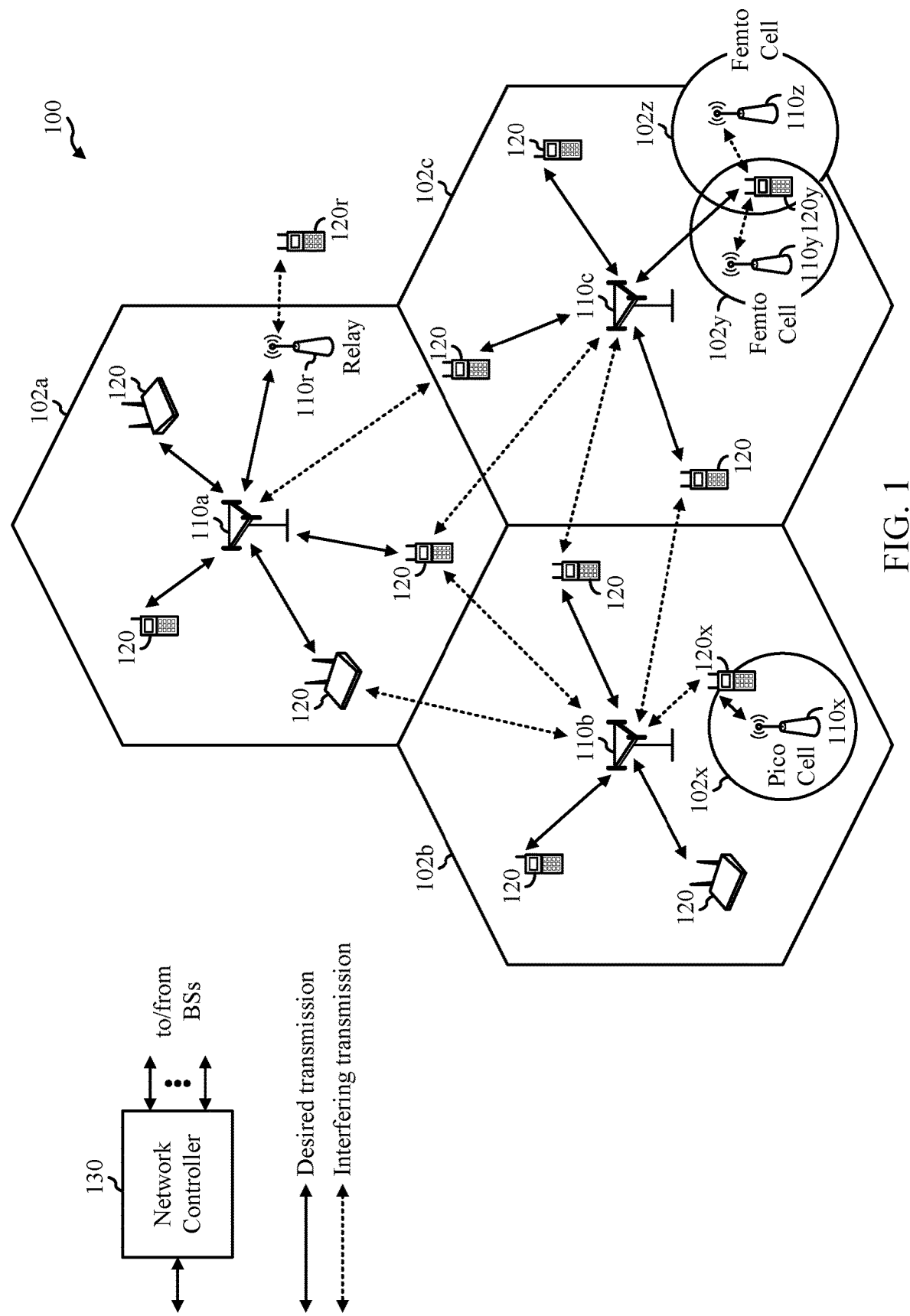
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a BS 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the BS 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
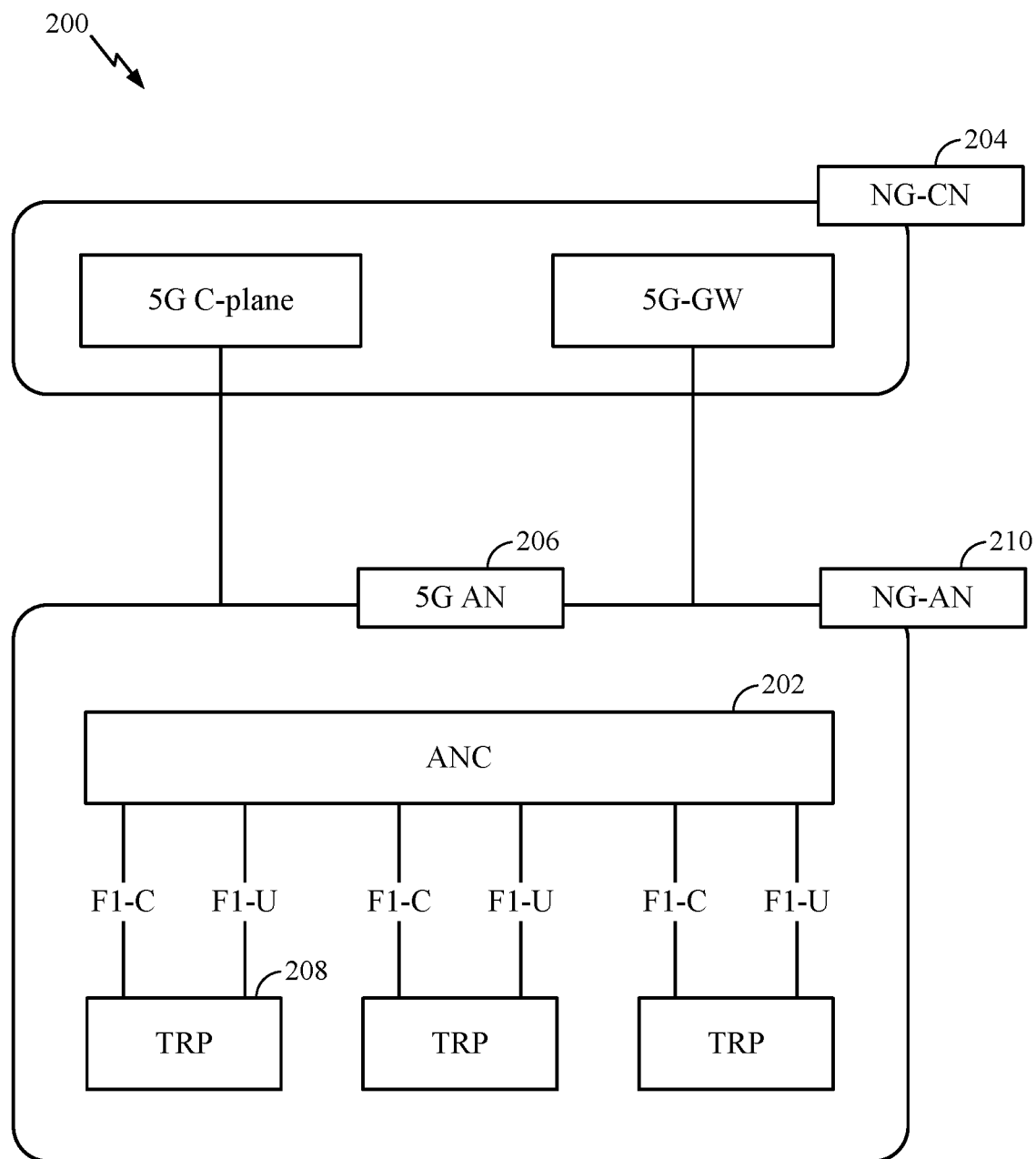
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
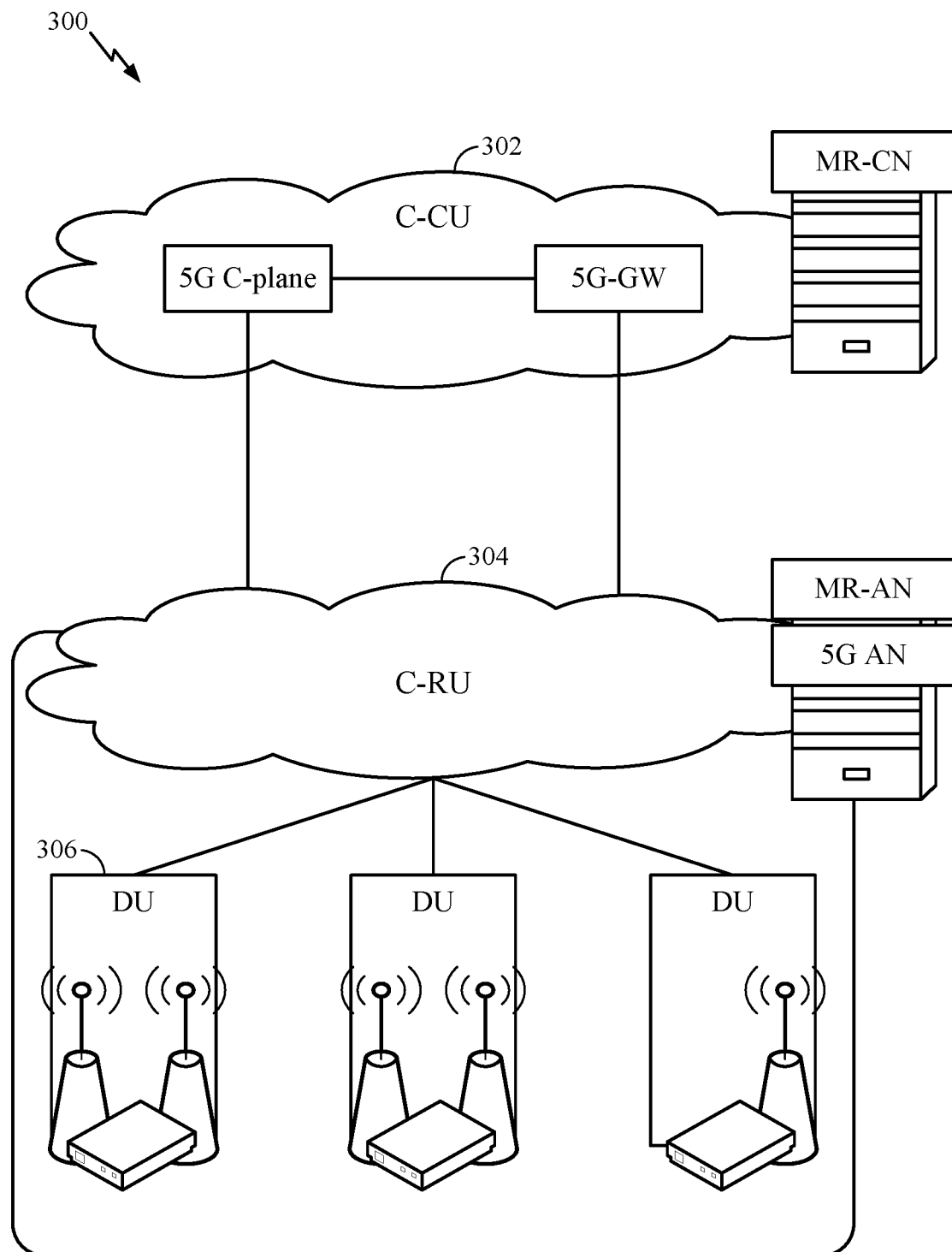
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
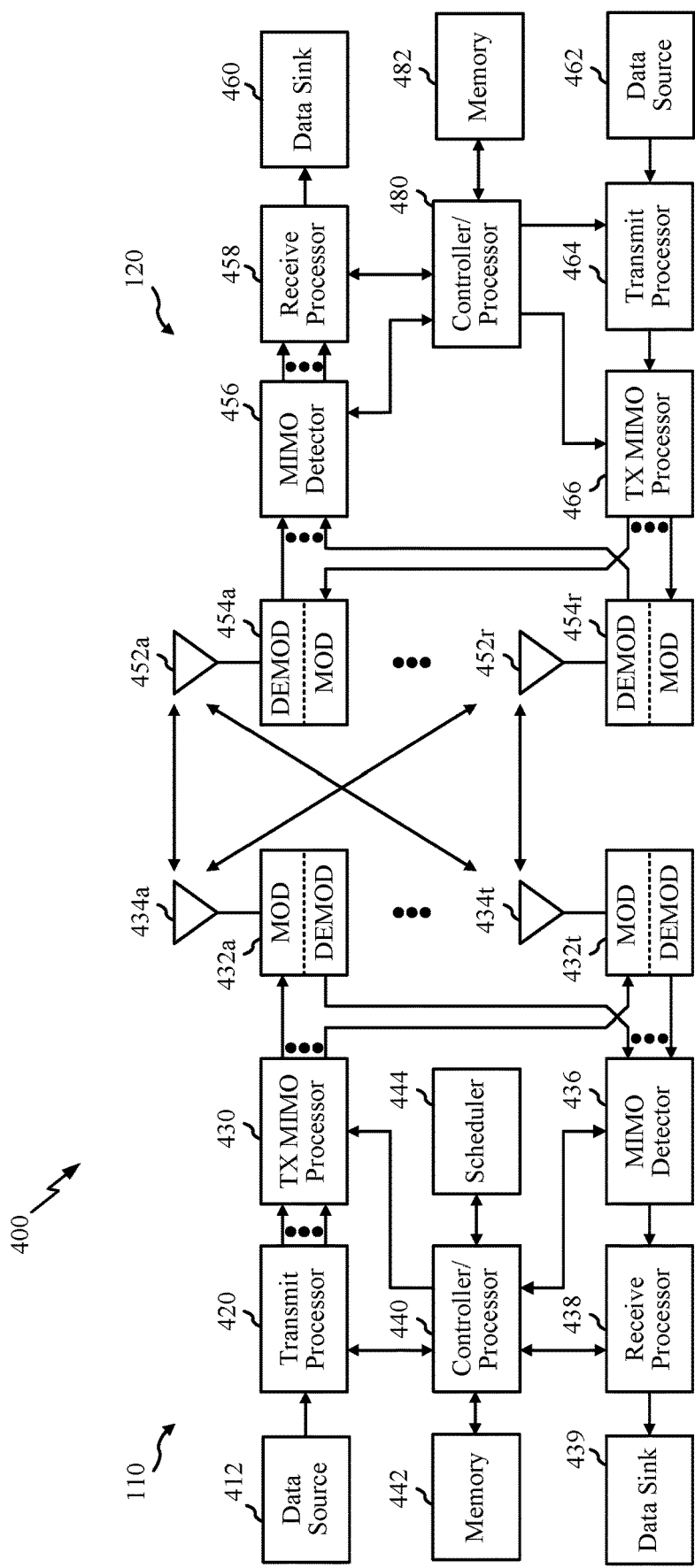
FIG. 4 is a block diagram conceptually illustrating a design of an example base station (BS) and user equipment (UE), in accordance with certain aspects of the present disclosure.

FIG. 4 illustrates example components 400 of the BS 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-11.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the BS 110 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
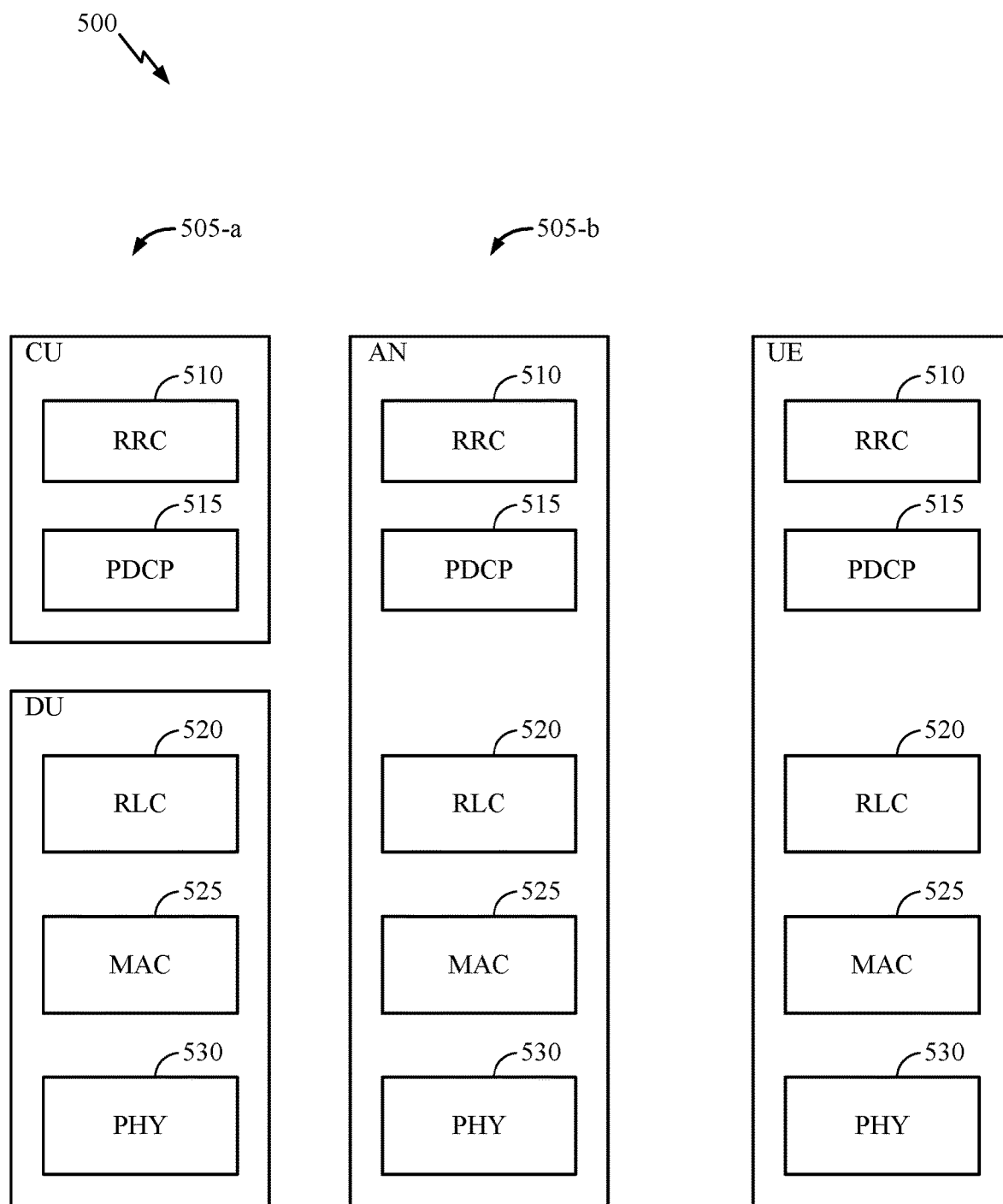
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
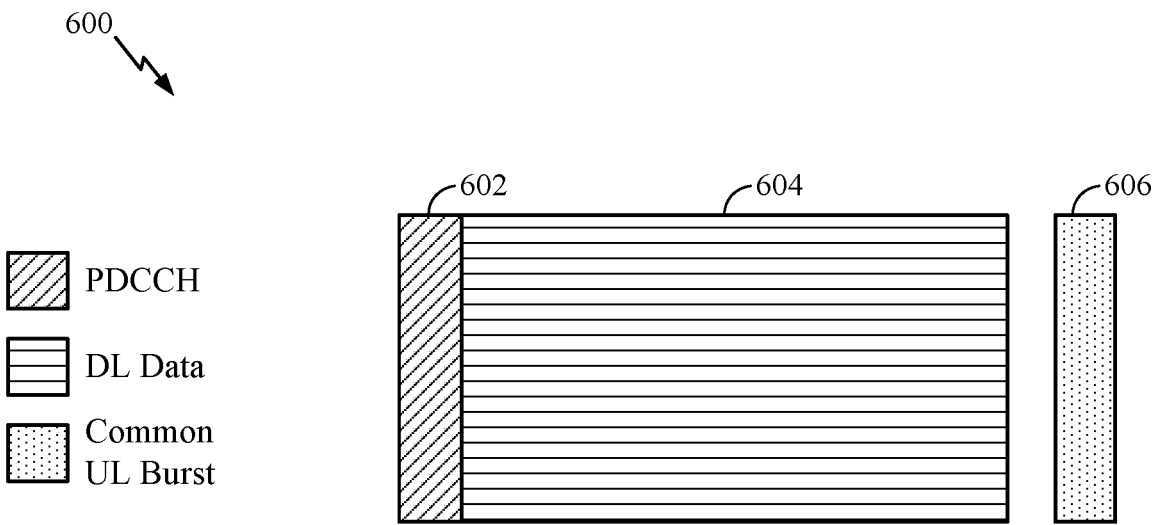
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
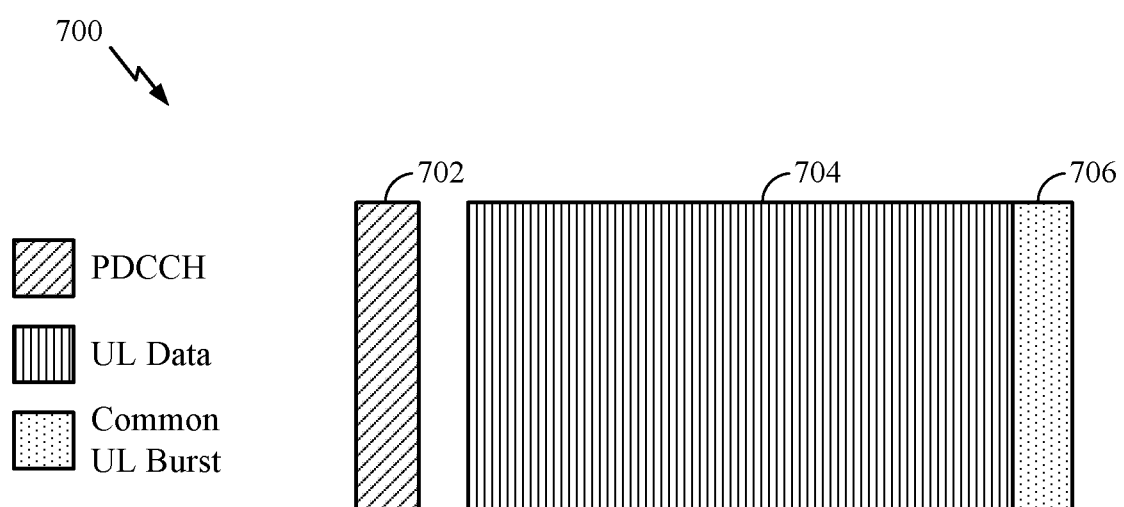
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Millimeter Wave (mmWave) Systems

As used herein, the term millimeter wave (mmWave) generally refers to spectrum bands in very high frequencies such as 28 GHz. Such frequencies may provide very large bandwidths capable of delivering multi-Gbps data rates, as well as the opportunity for extremely dense spatial reuse to increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWave operates, the small wavelengths enable the use of a large number of antenna elements in a relatively small form factor. This characteristic of mmWave can be leveraged to form narrow directional beams that can send and receive more energy, which may help overcome the propagation/path loss challenges.

These narrow directional beams can also be used for spatial reuse. This is one of the key enablers for using mmWave for mobile broadband services. In addition, the non-line-of-site (NLOS) paths (e.g., reflections from nearby building) can have very large energies, providing alternative paths when line-of-site (LOS) paths are blocked. Aspects of the present disclosure may take advantage of such directional beams, for example, by using the beams for random access channel (RACH) communication.

Figure 8:
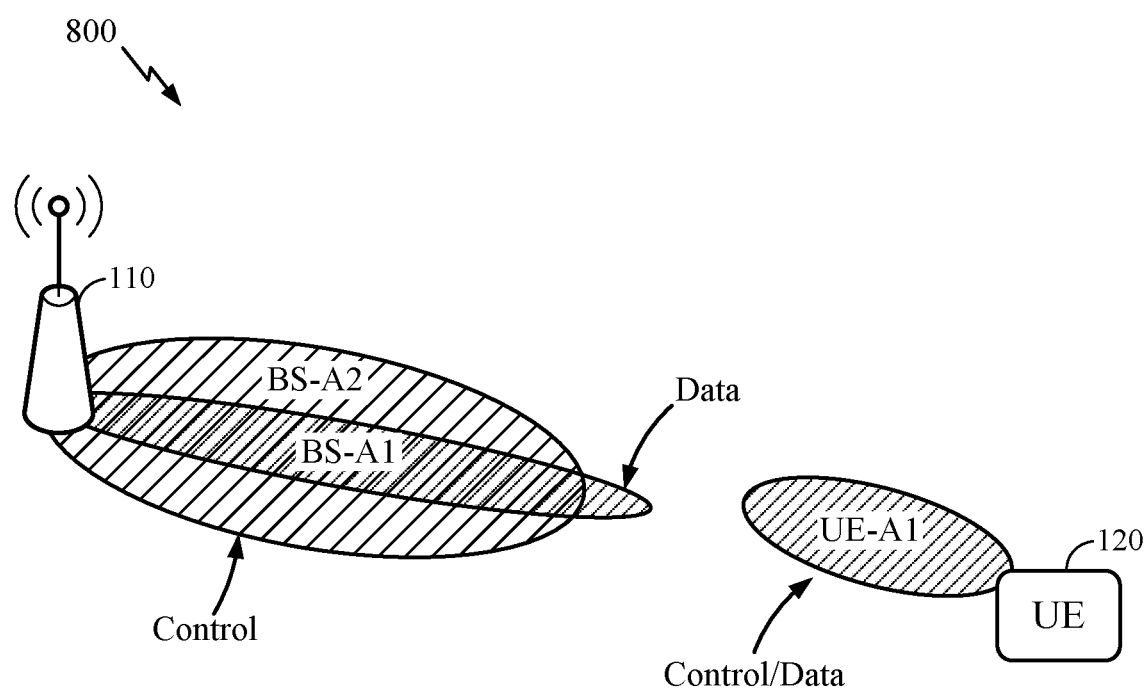
FIG. 8 illustrates an example communication system having active beams, in accordance with aspects of the present disclosure.

FIG. 8 illustrates an example communication system 800 having active beams, in accordance with aspects of the present disclosure. A BS and a UE may communicate using a set of active beams. Active beams may refer to BS and UE beam pairs that are used to transmit data and control channels. A data beam may be used to transmit data and a control beam may be used to transmit control information. As illustrated in FIG. 8, data beam BS-A1 may be used to transmit DL data and control beam BS-A2 may be used to transmit DL control information.

A BS may monitor beams using beam measurements and feedback from a UE. For example, a BS may monitor active beams using DL reference signals. A BS may transmit a DL RS, such as a measurement reference signal (MRS), channel state information reference signal (CSI-RS), or a synchronization (synch) signal. A UE may report, to the BS, a reference signal receive power (RSRP) associated with a received reference signal. In this manner, the BS may monitor active beams.

Example Random Access Channel (RACH) Procedure

A random access channel (RACH) is a channel that may be shared by multiple UEs and may be used by the UEs to access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 9:
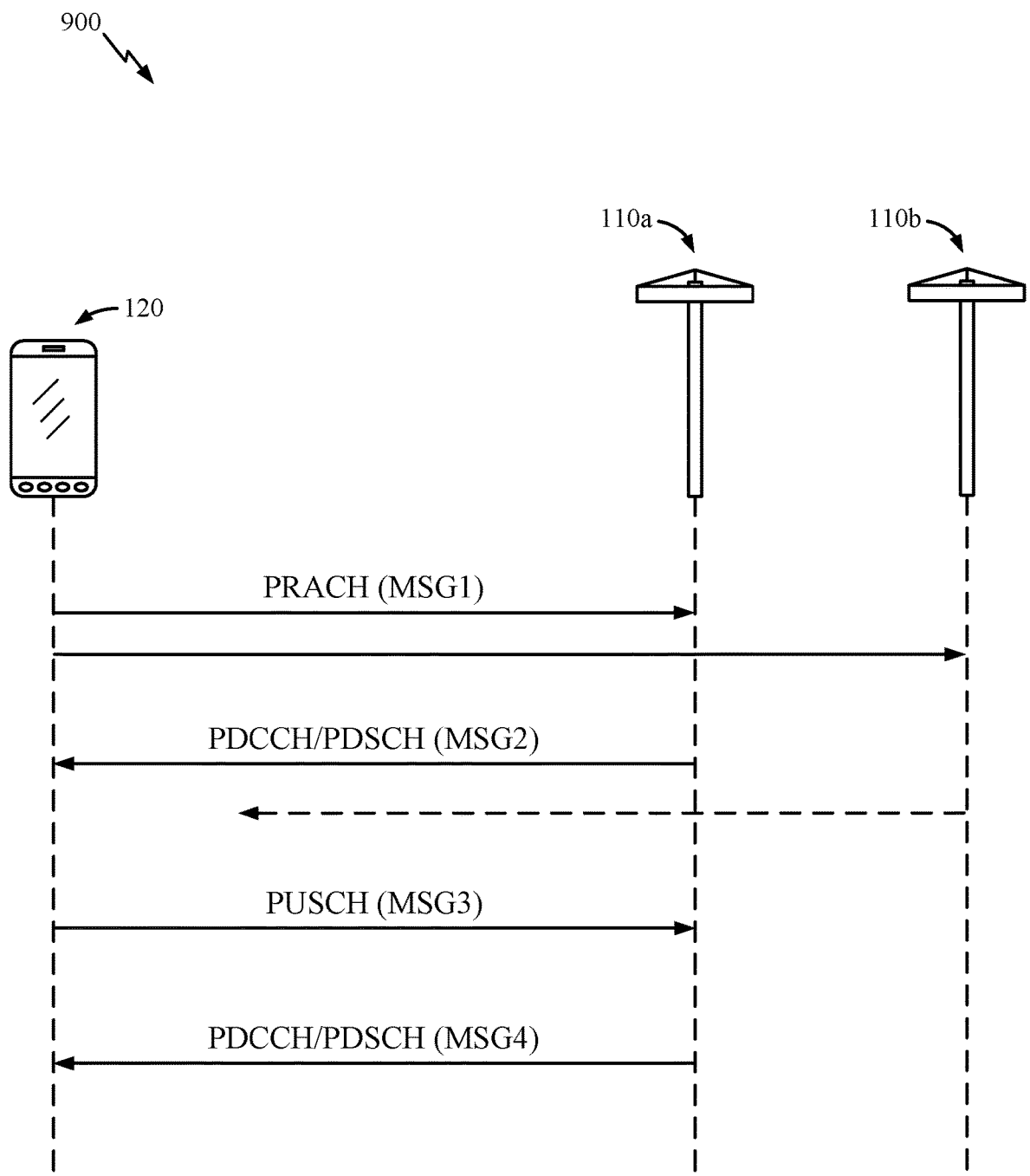
FIG. 9 is a timing diagram illustrating an example four-step random-access channel (RACH) procedure, in accordance with certain aspects of the present disclosure.

FIG. 9 is a timing diagram 900 illustrating an example four-step RACH procedure, in accordance with certain aspects of the present disclosure. A first message (MSG1) may be sent from the UE 120 to BS 110*a* (e.g., eNB) and BS 110*b* on the physical random access channel (PRACH). In this case, MSG1 may only include a RACH preamble.

At least one of BS 110*a* or BS 110*b* may respond with a random access response (RAR) message (MSG2) which may include the identifier (ID) of the RACH preamble, a timing advance (TA), an uplink grant, cell radio network temporary identifier (C-RNTI), and a back off indicator. TA generally refers to an offset between the start of a received downlink subframe and a transmitted uplink subframe used to ensure that the downlink and uplink subframes are synchronized at the BS. In some cases, the TA may be estimated by the BS based on the PRACH (MSG1) sent by the UE to the BS.

MSG2 may include a physical downlink control channel (PDCCH) including control information for a following communication on a physical downlink shared channel (PDSCH), as illustrated. In response to MSG2, MSG3 is transmitted from the UE 120 to BS 110a on the PUSCH. MSG3 may include a RRC connection request, a tracking area update, and a scheduling request. The BS 110a then responds with MSG 4 which may include a contention resolution message.

Figure 10:
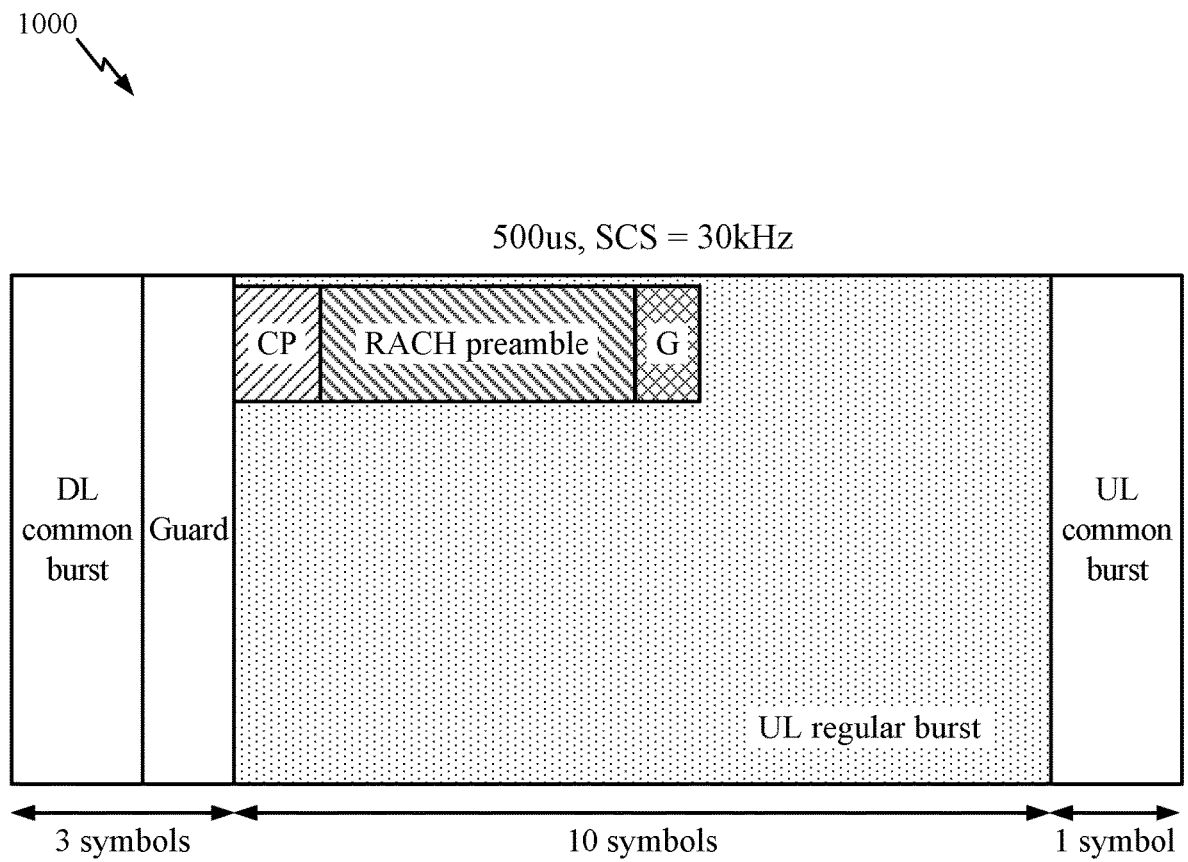
FIG. 10 is a diagram of an example uplink communication of a first message of a four-step RACH procedure, in accordance with certain aspects of the present disclosure.

FIG. 10 is a diagram of an example uplink communication 1000 of MSG1 for a four-step RACH procedure, in accordance with certain aspects of the present disclosure. The uplink communication 1000 begins with a DL common burst, and ends with an UL common burst, as illustrated. The PRACH is included as part of the regulator UL burst between the DL and UL common bursts and includes a cyclic prefix (CP).

In certain aspects, the RACH procedure messages may be used for new radio (NR). In certain aspects, the design of the random access procedure may take into account the possible use of single-beam and multiple beam operations, including non Rx/Tx reciprocity at BS or UE and full or partial Rx/Tx reciprocity at BS or UE. In certain aspects, when multiple beam-forming is applied to DL broadcast channels/signals for initial access, RACH resource(s) may be obtained by the UE from detected DL broadcast channels/signals. In addition, multiple occasions for RACH preamble transmission in a given time interval may be used. In certain aspects, RACH reception/RAR transmission occurs in TRPs/beams other than the one transmitting synchronization signals.

DL L1/L2 beam management procedures may also be supported within one or multiple TRPs. For example, a first procedure may be used to enable UE measurement on different TRP Tx beams to support selection of TRP Tx beams/UE Rx beam(s). Beamforming at TRP may include an intra/inter-TRP Tx beam sweep from a set of different beams. Beamforming at UE may include a UE Rx beam sweep from a set of different beams. TRP Tx beam and UE Rx beam may be determined jointly or sequentially.

A second procedure may be used to enable UE measurement on different TRP Tx beams to possibly change inter/intra-TRP Tx beam(s). The UE measurement may be from a possibly smaller set of beams for beam refinement than in the first procedure. A third procedure may be used to enable UE measurement on the same TRP Tx beam to change UE Rx beam in the case UE uses beamforming.

In certain aspects, when Tx/Rx reciprocity is available at a base station, at least for multiple beams operation, certain RACH procedure may be used for at least UEs in idle mode. Association between one or multiple occasions for DL broadcast channel/signal and a subset of RACH resources may be informed to the UE by broadcast system information or known by the UE.

In some cases, based on the DL measurement and the corresponding association, the UE selects the subset of RACH resources. At gNB, the DL Tx beam for the UE may be obtained based on the detected RACH preamble and would be also applied to MSG2. In some cases, UL grant in MSG2 may indicate the transmission timing of MSG3.

For the cases with and without Tx/Rx reciprocity, the common random access procedure may be used. When Tx/Rx reciprocity is not available, in certain aspects, for at least UEs in idle mode, DL Tx beam to gNB (e.g., RACH preamble/resource, MSG 3) is reported, and UL Tx beam to the UE, (e.g., RAR) is indicated.

Example Techniques for Power Ramping for
Random Access Channel (RACH) Preamble
Transmissions with Beam Switching In certain aspects, multiple RACH preamble message (MSG1) transmissions may be performed by the UE. For example, the UE may use a different uplink (UL) beam for each transmission of MSG1. With respect to a contention based random access (CBRA), each of the retransmissions of MSG1 by the UE may occur after a random access response (RAR) monitoring window has passed, and the UE has not received a RAR (MSG2) in response to the MSG1 transmission.

In certain aspects, power ramping of the MSG1 transmission may be supported. In the current NR standard, it is stipulated that a UE is to only switch a beam used for a subsequent retransmission of MSG1, or switch the transmission power for the subsequent retransmission of MSG1, but not both. In certain aspects, a counter may be used to track transmission power. For example, if the UE does not change beams for a subsequent retransmission of MSG1, the counter for power ramping may be increased. The counter for power ramping sets the current transmission power. In otherwords, if the UE does not change beams for a subsequent retransmission of MSG1, the power transmission of the subsequent retransmission of MSG1 may be increased (e.g., by incrementing the counter). However, if the UE does switch beams for the subsequent retransmission of MSG1, the counter for power ramping may remain unchanged (e.g., the power transmission of the subsequent retransmission of MSG1 may remain the same).

With respect to contention free random access (CFRA), a UE may be configured to transmit multiple MSG1s over dedicated RACH transmission occasions in the time domain, before the end of a monitored RAR window, if the configuration of the dedicated RACH transmission occasions in time domain is supported. The time resource used for the dedicated RACH in time domain for CFRA may be different from the time resources used for CBRA. Moreover, multiple MSG1s may be transmitted with same or different beams.

Multiple MSG1 transmissions allows for combining of the gain from the MSG1 transmissions at the base station to enhance coverage. Moreover, beam switching allows for multi-path diversity by using different spatial directions. Certain aspects of the present disclosure are generally directed to a joint design for power ramping and beam repetition/switching, to increase the gain of MSG1 received at the base station. For example, different beams used to transmit MSG1 may be designed to have an equal chance for transmission with an equal amount of transmit power.

Figure 11A:
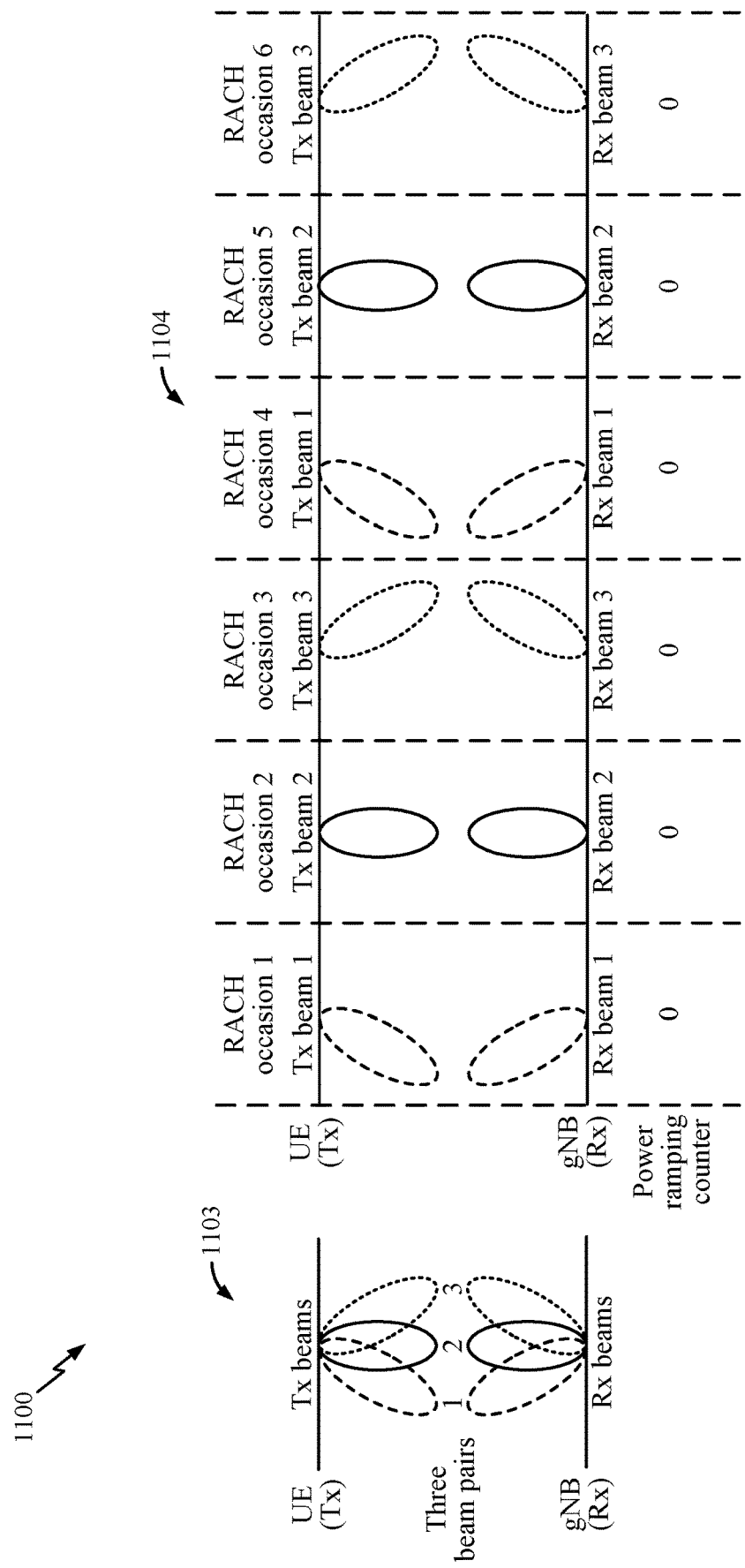
FIGS. 11A and 11B illustrate example RACH protocols for transmitting of a RACH preamble using different beams, in accordance with certain aspects of the present disclosure.
Figure 11B:
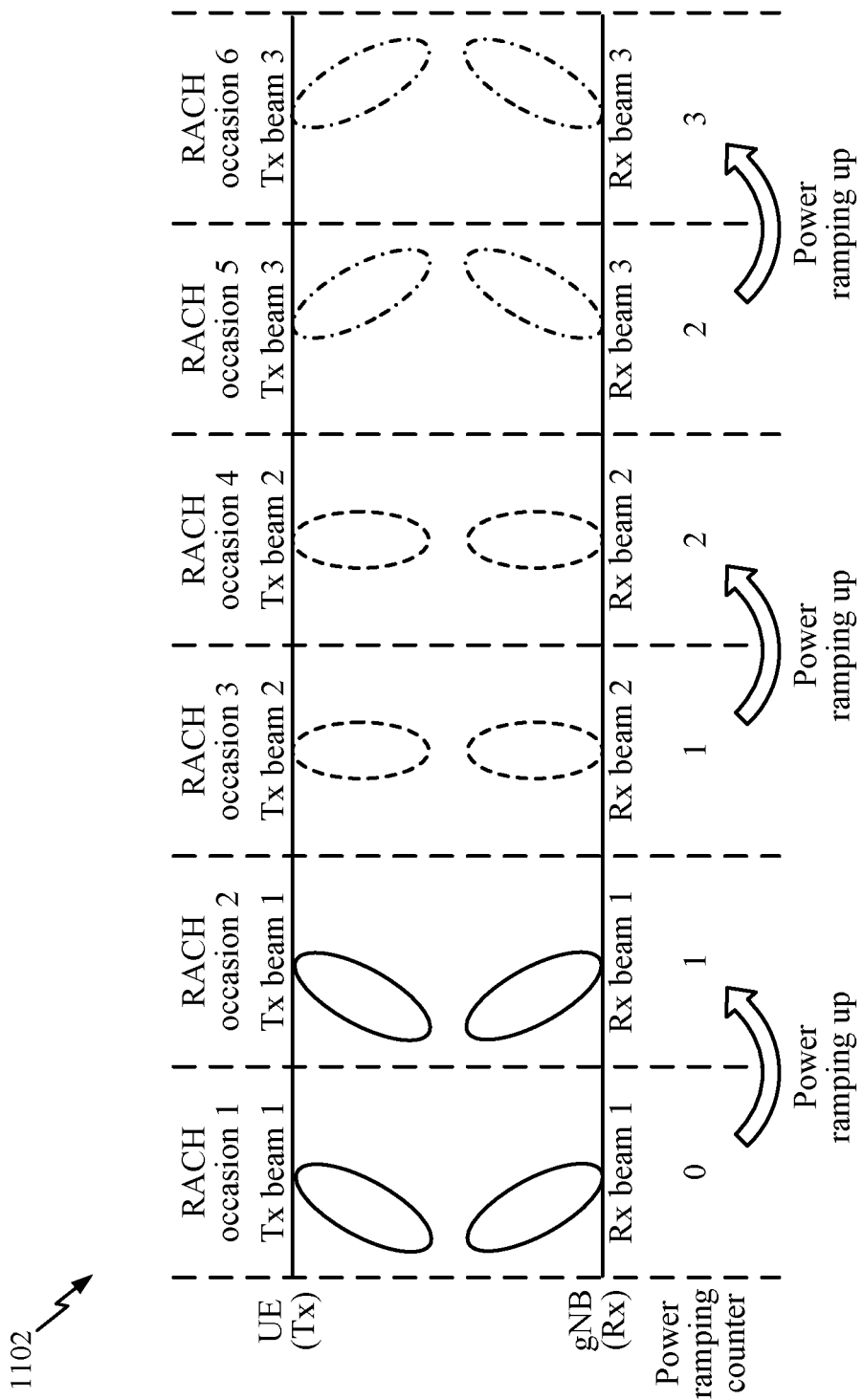

FIGS. 11A and 11B illustrate example RACH protocols 1100 and 1102 for transmitting MSG1 using different beams, in accordance with certain aspects of the present disclosure. As presented above, in the current NR standard, it is stipulated that a UE is to only switch a beam used for a subsequent retransmission of MSG1, or switch the transmission power for the subsequent retransmission of MSG1, but not both. As illustrated in diagram 1103, three beam pairs may be used for communicating MSG1. For example, as illustrated in diagram 1104, for the RACH protocol 1100, MSG1 is transmitted during three RACH occasions 1, 2, and 3 using beam 1, beam 2, and beam 3, respectively. After the RACH occasions 1, 2, and 3, the UE retransmits MSG1 using beam 1, beam 2, and beam 3 during the next three RACH occasions 4, 5, and 6. Thus, since the transmit beam switches after each RACH occasion, the power ramping counter remains unchanged, and hence, the transmission power remains unchanged. While RACH protocol 1100 allows for an equal number of transmissions for each beam, it may not allow for the power ramping counter to be increased since the beam is being switched after each RACH occasion.

For the RACH protocol 1102, MSG1 is transmitted using the same beam twice across two RACH occasions, allowing for the power ramping counter to be increased. For example, the same beam (beam 1) is used for the transmission of MSG1 in RACH occasions 1 and 2, but with different transmission powers. Similarly, the same beam (beam 2) is used for the transmission of MSG1 in RACH occasions 3 and 4, but with different transmission powers. However, the RACH protocol 1102 results in certain beams being transmitted at a higher transmit power. For example, in this case, MSG1 is being transmitted using beam 3 with a power ramping counter set to 2 and 3, while MSG1 is being transmitted using beam 1 with the power ramping counter set to 0 and 1. Thus, the RACH protocol 1102 results in an unequal distribution of transmit power for different beams.

Certain aspects of the present disclosure provide RACH protocols that allow for power ramping and beam switching for multiple RACH preamble transmissions for CBRA (e.g., for initial access), and CFRA (e.g., for PDCCH triggered, mobility, and scheduling request). If there are multiple beam-paired links established between the base station and UE (e.g., when beam correspondence holds), the order of beams used for each RACH occasion may be predetermined. For example, in certain aspects of the present disclosure, the order (or rules for determining the order) may be be fixed in a specification or indicated to the UE by radio resource control (RRC), medium access control (MAC) control element (MAC-CE), remaining minimum system information (RMSI), other system information (OSI), handover command, or downlink control information (DCI) signaling. A fixed order (e.g., as specified by specification) may be applied for CBRA since CBRA is used for initial access, and a signaling-based technique may be used for CFRA since a connection is established between the UE and the base station before CFRA.

To achieve both gain combining at the base station and multi-path diversity, certain beams may be repeated according to an order (e.g., fixed, or signaled to the UE by the base station). Certain aspects of the present disclosure provide an order for beam switching that is compatible with the current power ramping rules in the NR standard (e.g., if UE does not change beam, the counter of power ramping increases, and if the UE conducts beam switching, the counter of power ramping remains unchanged, as previously described). Certain aspects of the present disclosure provide an ordering for beam switching that allows for power ramping while avoiding the unequal usage of beams and unequal power distribution across beams as described with respect to FIGS. 11A and 11B.

Figure 12:
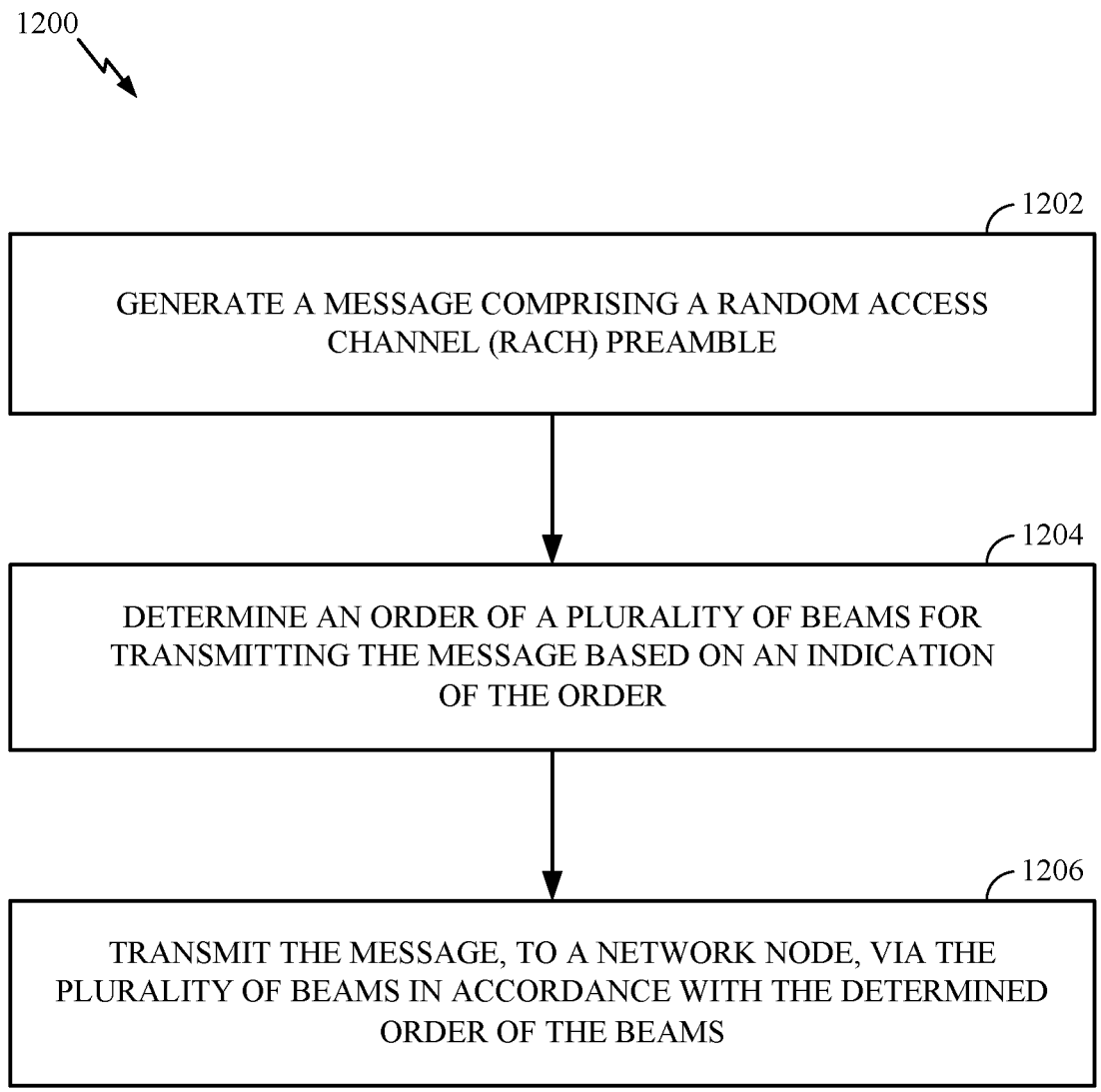
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed by a UE, such as the UE 120.

The operations 1200, begin at block 1202, by generating a message comprising a RACH preamble. At block 1204, the operations 1200 continue by determining an order of a plurality of beams for transmitting the message based on an indication of the order, and at block 1206, transmitting the message, to a network node, via the plurality of beams in accordance with the determined order of the beams. In certain aspects, the operations 1200 may also include receiving signaling, from the network node, including the indication of the order. For example, the signaling may include a RRC message, MAC-CE, RMSI, OSI, handover command, or DCI, as previously described. In certain aspects, the indication of the order may be an indication of a fixed order (e.g., in accordance with a standard) of the plurality of beams stored at the UE.

Figure 13:
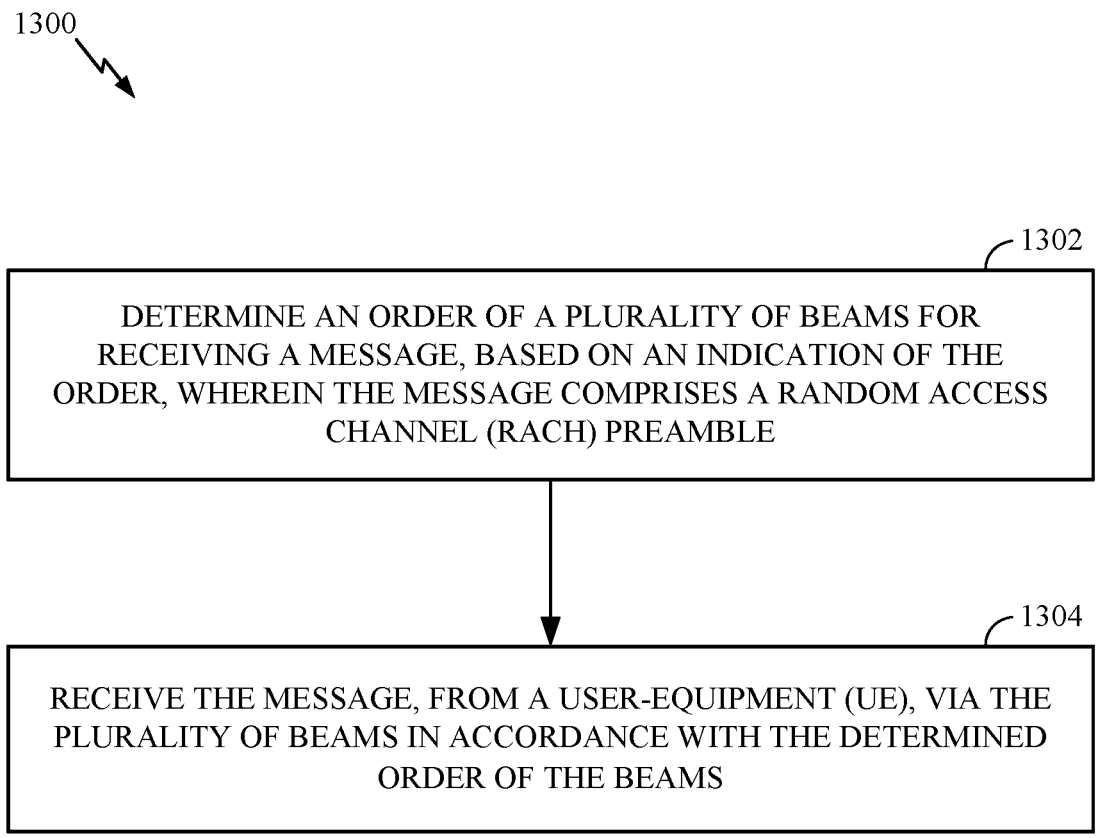
FIG. 13 is a flow diagram illustrating example operations for wireless communication by a network node, in accordance with certain aspects of the present disclosure.

FIG. 13 is a flow diagram illustrating example operations 1300 for wireless communication, in accordance with certain aspects of the present disclosure. The operations 1300 may be performed by a network node, such as the BS 110 (e.g., gNB).

The operations 1300, begin at block 1302, by determining an order of a plurality of beams for receiving a message, based on an indication of the order, wherein the message comprises a RACH preamble. At block 1304, the operations 1300 continue by receiving the message, from a UE, via the plurality of beams in accordance with the determined order of the beams. In certain aspects, the operations 1300 may also include transmitting signaling, from the network node, including the indication of the order. For example, the signaling may include a RRC message, MAC-CE, RMSI, OSI, handover command, or DCI, as previously described. In certain aspects, the indication of the order may be an indication of a fixed order (e.g., in accordance with a standard) of the plurality of beams stored at the UE.

Figure 14:
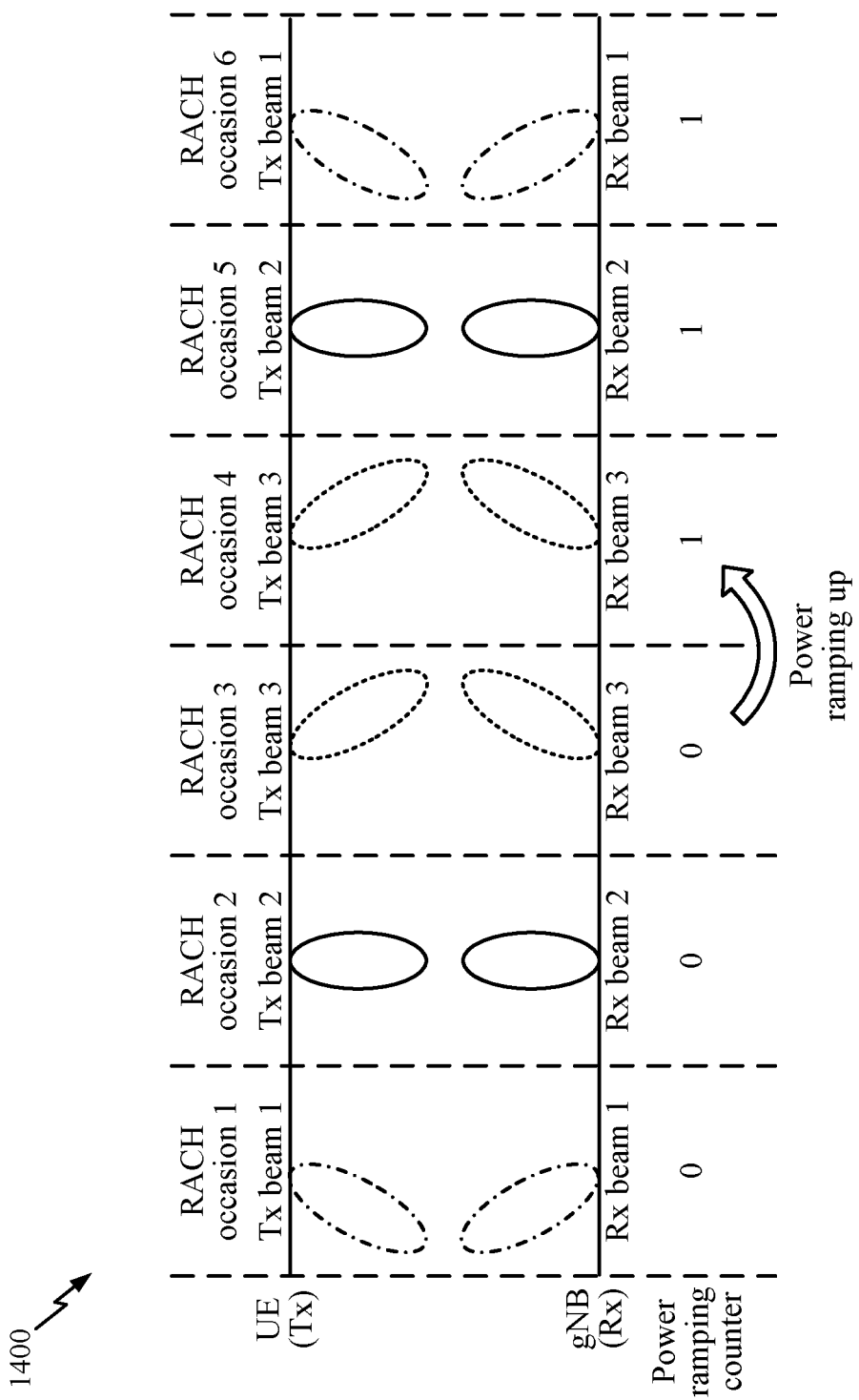
FIG. 14 illustrates an example RACH protocol for transmitting a RACH preamble using different beams, in accordance with certain aspects of the present disclosure.

FIG. 14 illustrates an example RACH protocol 1400 for transmitting MSG1 using different beams, in accordance with certain aspects of the present disclosure. Certain aspects of the present disclosure provide for reversing an order of beam switching after a certain number of RACH occasions (e.g., after RACH occasion 3). For example, if MSG1 is transmitted using N beams in the order of 1 to N in a first round of RACH occasion (e.g., RACH occasions 1, 2, and 3 in FIG. 14), MSG1 is then transmitted in a subsequent round of RACH occasions (e.g., RACH occasions 4, 5, and 6) in the order of N, N−1 to 1, N being an integer greater than 1. In other words, where N is equal to 3, as is the case in the example RACH protocol 1400 of FIG. 14, beams 1, 2, and 3 are transmitted during RACH occasions 1, 2, and 3, respectively, and beams 3, 2, and 1 are transmitted during RACH occasions 4, 5, and 6, respectively, as illustrated.

Within each round of RACH occasions, with the exception of the last RACH occasion (e.g., RACH occasion 3 in FIG. 14), the beam changes after each of the RACH occasions (e.g., after RACH occasions 1 and 2), and thus, no power ramping is applied within each round of RACH occasions. At the boundary of each round of RACH occasions (e.g., after RACH occasion 3), the same beam is repeated twice, and thus, the transmit power increases. Therefore, the RACH protocol 1400 allows for an equal chance of transmission via each beam with an equal amount of transmit power for each beam, while also maintaining compatibility with the NR standard.

Certain aspects of the present disclosure provide a set-based beam switching and power ramping protocol. For example, beams (e.g., N beams in total) for RACH preamble transmissions may be grouped into one or multiple subsets of beams. Thus, the N beams may be grouped into subsets of beams which may have different sizes. In certain aspects, a single beam may be contained in multiple sets. In other words, two or more subsets may have one or more common beams. Two subsets of beams may be regarded as different if at least one (or a configurable number of) element (e.g., beams) is different.

In certain aspects, the elements of a subset of beams may or may not be ordered. For example, a specific order may be determined for the transmission of the beams in the subset. If ordering of subsets is supported, a single beam may appear multiple times in the same subset. If a subset of M beams is activated to be used for transmission of MSG1, the beams in the subset are swept in M consecutive RACH occasions, M being an integer greater than 1. If the subset of M beams is ordered, then the sweeping of the beams in the M RACH occasions follow the order corresponding to the subset. In some cases, multiple subsets may be activated in order. For example, the order at which the subsets are activated may be predetermined (e.g., based on a standard and stored at the UE), or signaled to the UE by RRC, RMSI, OSI, handover command, MAC-CE, or DCI.

Certain aspects of the present disclosure provide power ramping rules for set-based beam switching. For example, in certain aspects, if the UE does not change a beam subset, the counter of power ramping may be increased, and if the UE conducts beam subset switching, the counter of power ramping may remain unchanged.

Figure 15:
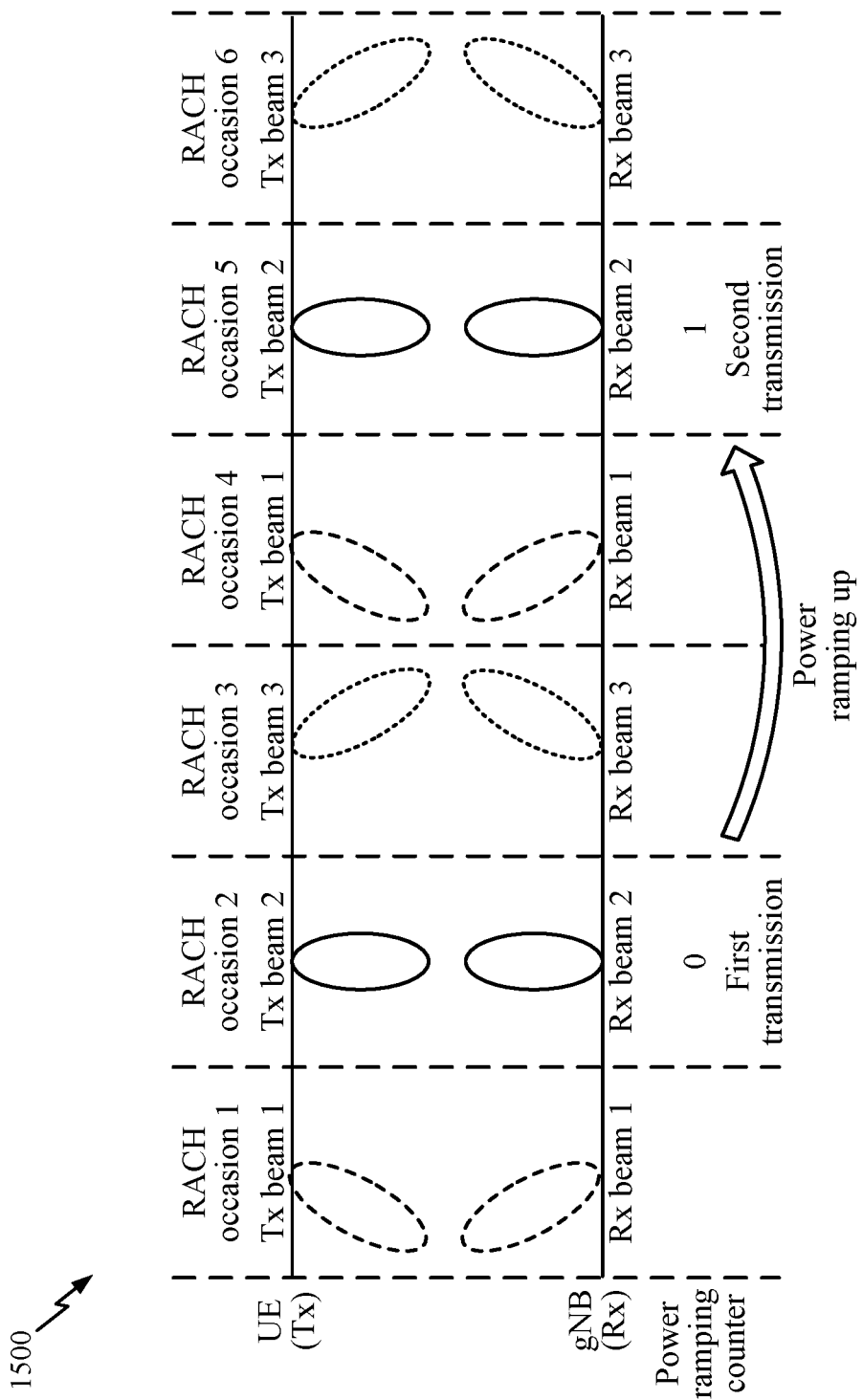
FIG. 15 illustrates an example RACH protocol for transmitting a RACH preamble in accordance with power ramping rules for set-based beam switching, in accordance with certain aspects of the present disclosure.

FIG. 15 illustrates an example RACH protocol 1500 for transmitting MSG1 in accordance with power ramping rules for set-based beam switching, in accordance with certain aspects of the present disclosure. In this case, a single beam subset is repeated twice. The beam subset includes beams 1, 2, and 3. After the first transmission of MSG1 via the beam subset, the transmission power is increased, and MSG1 is transmitted again using the beam subset and using the increased transmit power, as illustrated. However, when a beam within a beam subset is switched, the transmission power may remain unchanged.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user-equipment (UE), comprising:
   generating a message comprising a random access channel (RACH) preamble;
   determining an order of a plurality of beams for transmitting the message based on an indication of the order; and
   transmitting the message, to a network node, via the plurality of beams in accordance with the determined order of the beams.

2. The method of claim 1, further comprising receiving signaling, from the network node, including the indication of the order.

3. The method of claim 2, wherein the signaling comprises a radio resource control (RRC) message, medium access control (MAC) control element (CE), remaining minimum system information (RMSI), other system information (OSI), handover command, or downlink (DL) control information (DCI).

4. The method of claim 1, wherein the indication of the order comprises an indication of a fixed order of the plurality of beams stored at the UE.

5. The method of claim 1, wherein the plurality of beams are transmitted before an end of a same random access response (RAR) monitoring window.

6. The method of claim 1, wherein:
   the transmission of the message comprises transmitting the message in accordance with the determined order of the plurality of beams, and subsequently transmitting the message in accordance with another order of the plurality of beams; and
   the plurality of beams comprise N beams, N being an integer greater than one, wherein beam N is a last beam to be used for transmitting the message in accordance with the determined order of the beams, and is an initial beam to be used for transmitting the message in accordance with the other order of the beams.

7. The method of claim 6, wherein the other order of the plurality of beams is in reverse order of the determined order of the plurality of beams.

8. The method of claim 7, wherein:
the message is transmitted in accordance with the determined order of the beams with a first transmission power;
the message is transmitted in accordance with the other order of the beams with a second transmission power; and
the second transmission power is greater than the first transmission power.

9. The method of claim 1, further comprising determining multiple subsets of the plurality of beams, wherein the determined order of the plurality of beams comprises an order of the multiple subsets.

10. The method of claim 9, wherein the determined order of the plurality of beams further comprises an order of the beams for each of the multiple subsets.

11. The method of claim 9, wherein the transmission of the message comprises:
transmitting the message via a first subset of the multiple subsets using a transmit power, and subsequently transmitting the message via a second subset of the multiple subsets using the same transmit power.

12. The method of claim 9, wherein the transmission of the message comprises:
transmitting the message via a subset of the multiple subsets using a first transmit power, and subsequently transmitting the message via the same subset of the multiple subsets using a second transmit power, the second transmit power being greater than the first transmit power.

13. The method of claim 9, wherein at least two of the subsets include one or more common beams.

14. A method for wireless communication by a network node, comprising:
determining an order of a plurality of beams for receiving a message, based on an indication of the order, wherein the message comprises a random access channel (RACH) preamble; and
receiving the message, from a user-equipment (UE), via the plurality of beams in accordance with the determined order of the beams.

15. The method of claim 14, further comprising transmitting signaling, to the UE, including the indication of the order.

16. The method of claim 15, wherein the signaling comprises a radio resource control (RRC) message, a medium access control (MAC) control element (CE), remaining minimum system information (RMSI), other system information (OSI), handover command, or downlink (DL) control information (DCI).

17. The method of claim 14, wherein the indication of the order comprises an indication of a fixed order of the plurality of beams stored at the network node.

18. The method of claim 14, wherein the plurality of beams are received during a same random access response (RAR) window.

19. The method of claim 14, wherein:
the reception of the message comprises receiving the message in accordance with the determined order of the beams, and subsequently receiving the message in accordance with another order of the plurality of beams; and
the plurality of beams comprise N beams, N being an integer greater than one, wherein beam N is a last beam to be used for receiving the message in accordance with the determined order of the beams, and is an initial beam to be used for receiving the message in accordance with the other order of the beams.

20. The method of claim 19, wherein the other order of the plurality of beams is in reverse order of the determined order of the beams.

21. The method of claim 14, further comprising determining multiple subsets of the plurality of beams, wherein the determined order of the plurality of beams comprises an order of the multiple subsets.

22. The method of claim 21, wherein the determined order of the plurality of beams further comprises determining an order of the beams for each of the multiple subsets.

23. The method of claim 21, wherein at least two of the subsets include the same beam of the plurality of beams.

24. An apparatus for wireless communication, comprising:
a processing system configured to:
generate a message comprising a random access channel (RACH) preamble; and
determine an order of a plurality of beams for transmitting the message based on an indication of the order; and
a transmitter configured to transmit the message, to a network node, via the plurality of beams in accordance with the determined order of the beams.

25. An apparatus for wireless communication, comprising:
a processing system configured to determine an order of a plurality of beams for receiving a message, based on an indication of the order, wherein the message comprises a random access channel (RACH) preamble; and
a receiver configured to receive the message, from a user-equipment (UE), via the plurality of beams in accordance with the determined order of the beams.

* * * * *